United States Patent
May (10) Patent No.: US 9,205,781 B1
(45) Date of Patent: Dec. 8, 2015

(54) RETRACTABLE TRUCK STEP WITH CAN BUS INTERFACE

(71) Applicant: Richard P May, Yorba Linda, CA (US)

(72) Inventor: Richard P May, Yorba Linda, CA (US)

( * ) Notice: Subject to any disclaimer, the term of this patent is extended or adjusted under 35 U.S.C. 154(b) by 0 days.

(21) Appl. No.: 14/549,377

(22) Filed: Nov. 20, 2014

(51) Int. Cl.
 *B60R 3/02* (2006.01)
(52) U.S. Cl.
 CPC ........................... *B60R 3/02* (2013.01)
(58) Field of Classification Search
 CPC ..................................................... B60R 3/02
 USPC ............................................................ 701/49
 See application file for complete search history.

(56) References Cited

U.S. PATENT DOCUMENTS

| | | | |
|---|---|---|---|
| 6,100,793 A | 8/2000 | Dimou | |
| 6,641,158 B2 | 11/2003 | Leitner | |
| 6,830,257 B2 | 12/2004 | Leitner | |
| 6,834,875 B2 | 12/2004 | Leitner et al. | |
| 6,938,909 B2 | 9/2005 | Leitner | |
| 6,942,233 B2 | 9/2005 | Leitner et al. | |
| 7,007,961 B2 | 3/2006 | Leitner et al. | |
| 7,055,839 B2 | 6/2006 | Leitner | |
| 7,081,816 B2 | 7/2006 | Schebel et al. | |
| 7,118,120 B2 * | 10/2006 | Lee | B60R 3/02 280/163 |
| 7,163,221 B2 | 1/2007 | Leitner | |
| 7,287,771 B2 * | 10/2007 | Lee | B60R 3/02 280/163 |
| 7,367,574 B2 * | 5/2008 | Leitner | B60R 3/02 280/163 |
| 7,380,807 B2 * | 6/2008 | Leitner | B60R 3/02 280/163 |
| 7,398,985 B2 | 7/2008 | Leitner et al. | |
| 7,413,204 B2 | 8/2008 | Leitner | |
| 7,487,986 B2 * | 2/2009 | Leitner | B60R 3/02 280/163 |
| 7,566,064 B2 | 7/2009 | Leitner et al. | |
| 7,584,975 B2 | 9/2009 | Leitner | |
| 7,692,542 B2 | 4/2010 | Outzs | |
| 7,740,261 B2 * | 6/2010 | Leitner | B60R 3/02 280/163 |
| 8,042,821 B2 * | 10/2011 | Yang | B60R 3/02 280/163 |
| 8,052,162 B2 * | 11/2011 | Yang | B60R 3/02 280/163 |
| 8,056,913 B2 * | 11/2011 | Kuntze | B60R 3/02 280/163 |
| 8,262,113 B1 * | 9/2012 | Chafey | B60R 3/02 280/163 |
| 8,469,380 B2 * | 6/2013 | Yang | B60R 3/02 182/127 |
| 8,602,431 B1 | 12/2013 | May | |
| 8,662,512 B2 | 3/2014 | May | |
| 2003/0184040 A1 * | 10/2003 | Leitner | B60R 3/02 280/166 |
| 2006/0214386 A1 | 9/2006 | Watson | |
| 2007/0194916 A1 | 8/2007 | Hewitt et al. | |
| 2013/0079998 A1 * | 3/2013 | Furness | B60S 3/00 701/49 |

OTHER PUBLICATIONS

Amp Research, Installation Guide Amp research PowerStep Sep. 18, 2012.*

* cited by examiner

*Primary Examiner* — Mary Cheung
*Assistant Examiner* — Frederick Brushaber
(74) *Attorney, Agent, or Firm* — Kirk A. Buhler; Buhler & Associates (57) ABSTRACT

Improvements using a door sensors or monitoring the vehicle CAN bus to determine when a door is opened or closed to simplify installation of a retractable door step to send a wireless or wired command to a step. Upon door movement the transmitter sends an open status message to a receiver where the message data is stored and the controller determines the correct responses. The step remains lowered until the receiver stops receiving messages indicating a door is closed or the transmitter on an open door has timed out ceasing transmissions. The step extension mechanism is a two-bar link that transfers rotation from a sealed waterproof motor and transmission to extend and retract the step.

17 Claims, 10 Drawing Sheets

RETRACTABLE TRUCK STEP WITH CAN BUS INTERFACE

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to a retractable/extendable step. More particularly, the present retractable step interfaces with the CAN bus in modern vehicles to signal when to extend and retract a vehicle step to assist entry into the vehicle.

2. Description of Related Art Including Information Disclosed Under 37 CFR 1.97 and 1.98

High ground clearance vehicle such as trucks, SUV's and four wheel drive vehicle typically create a problem for people to get into because the distance between the ground and the floorboard of the vehicle can be great. To reduce the height of the step, fixed running boards are often installed. While the fixed running board makes entry into the vehicle easier the fixed running board defeats the purpose of the vehicle having high ground clearance. Another solution is to provide an extendable/retractable step. These steps are usually wired to the door switch of the vehicle to extend and retract the step based upon the status of the door switch. Wiring the step into the vehicle usually requires removal of door or interior panels to gain access to the switch wiring. Car dealers and new vehicle owners are often apprehensive to have modifications made to the interior of their new vehicles and possibly voiding the new car warranty. There is a need to provide a step signaling mechanism that minimizes disassembly of the interior of a vehicle. Some patents have been published and issued on systems that describe signaling systems to extend and retract a truck step. Exemplary examples of patents covering these products are disclosed herein.

U.S. Pat. Nos. 6,942,233, 7,398,985, 7,413,204 and 7,584,975 issued to Horst Leitner disclose Retractable Vehicle Steps. These retractable vehicle steps require the installer to cut into the electrical system of a vehicle to obtain power for the retractable step and also require the installer to connect into the door switch on all the doors where the step will be extended. This requires running a significant amount of wiring to each door, to a controller and to the extension mechanism. Some of these patents also disclose using the key fob that unlocks the door to extend a step. While these patents disclose an extendable and retractable step, they either rely upon wiring the system into a door switch or the key fob that can leave a step extended until some signal that retracts the step(s).

U.S. Pat. No. 7,081,816 issued Jul. 25, 2006 to Dean David Schebal et al., discloses a Compact Wireless Sensor. The sensor is for placement in a door or window and sends a signal when the door or window is opened. The signal does not activate a step to extend or retract and further does not send a complimentary signal to indicate when the door or window has been closed. The device uses a timer to sample the state of the sensor and send updated information only when the timer initiates a reading and the status changes. This sensor is configured for installation within a wood doorjamb and is not configured for installation into an automotive door.

U.S. Pat. No. 7,692,542 issued Apr. 6, 2010 to Allan Outzs discloses a Door Position Monitor that couples a magnetic field through the door to determine the status of the door. The sensor uses a wired connection to a magnetic reed switch to determine the status of the door. While this patent determines the status of the door it does not transmit a wireless signal to activate a step for entry or exit from a vehicle.

Modern vehicles have an integrated CAN bus (controller area network). The CAN bus is a vehicle bus standard that is designed to allow microcontrollers and devices to communicate with each other within a vehicle without a host computer. The protocol was released in 1986, came to market in 1987 and was mandatory on cars and light trucks sold in the US since 1996. This specification has two parts; part A is for the standard format with an 11-bit identifier, and part B is for the extended format with a 29-bit identifier. A CAN device that uses 11-bit identifiers is commonly called CAN 2.0A and a CAN device that uses 29-bit identifiers is commonly called CAN 2.0B.

What is needed is a wireless sensor that can be glued, bonded or otherwise secured to or near a door of a vehicle to determine when a door is opened or closed to signal a step to extend or retract the step based upon the status of the door. Accordingly, a wireless sensor and transmitter to operate a vehicle step which overcomes the above-stated problems is desired.

BRIEF SUMMARY OF THE INVENTION

It is an object of the retractable truck step with CAN bus interface to signal a motor to extend and retract a step on an elevated vehicle. The automatic vehicle entrance and exit step lowers for use when a vehicle door is opened and retracted when the door is closed. The step is placed at an intermediary height between the ground and the floorboard of the elevated vehicle. A typical installation hardwires the motion of the step with the door switch.

It is an object of the retractable truck step with CAN bus interface to use a wireless signal to trigger the drive motor to extend or retract the step. The wireless system makes installation of the retractable truck step easier by eliminating opening door, side or door sill panels to gain access to the door switch. Each door switch must be connected to move the steps separately on each side of a vehicle.

It is an object of the retractable truck step with CAN bus interface for the sensor to operate in a sleep mode while it is not transmitting a signal. The sleep mode reduces power consumption and the wireless transmitter only turns on when the door is opened to extend the step. A cyclic redundancy check (CRC) eliminates the need to send redundant transmission.

It is another object of the retractable truck step with CAN bus interface for the door sensors to be positioned at any location within the vehicle where the CAN bus is available.

This can be performed in less than a minute instead of the up to an hour to locate and install on a vehicle with multiple door sensors.

It is another object of the retractable truck step with CAN bus interface for the foot pad extension mechanism to be sealed from moisture and water intrusion. The water can enter as humidity from ambient conditions, rain or fording the vehicle. Water can cause corrosion and rust within the mechanism. Over an extended period of time rust and corrosion degrades the motor, connectors, gears and bearings. The sealing prevents premature failure of the mechanism. The motor and gear case are designed to prevent water from entering the motor or gear case. This is possible due to the short duty cycle of the motor. By not allowing water to enter the gear case or motor, the life of the actuator is greatly extended.

It is another object of the retractable truck step with CAN bus interface to utilize a torsion bar between the drive motor and an idler. The addition of a torsion bar that is attached to the drive shaft of the motor directly to the pivot point of the idler shaft serves several functions. By driving the idler with the torsion bar, both linkages pull up together. This keeps the board from hanging down and presenting an uneven appearance on the idler side. It also pulls up evenly thus removing any misalignment between the motor linkage and the idler linkage. This prevents corner loading of the bushings and keeps the any noise from occurring because of the uneven bushing contact. Because of a better load distribution on the motor, the torsion bar will extend the life of the motor.

It is still another object of the retractable truck step with CAN bus interface to use multiple command identifiers to differentiate one vehicle from another. The use of multiple ID codes reduces the potential of opening a door on a first vehicle and having the step of a second vehicle extend unexpectedly.

It is still another object of the retractable truck step with CAN bus interface to use the CAN bus to signal the step to extend and retract based upon the door being opened. The CAN bus interface can send a wired or wireless command to the retractable step.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

This document discloses three different approaches to signaling a step to be extended and retracted. The two different approaches are outlined herein.

Door Transmitter Approach

This system consists of four Sensor/Transmitters mounted in the vehicle door frames. Through the use of magnets and reed switches an open door is sensed and on that event "open door" messages are transmitted to a vehicle mounted Receiver. The Receiver signals the step Controller through a wired interface to actuate the motors to extend or retract the automatic step(s). Since only "open door" messages are transmitted to the receiver it is a function of the receiver to determine the closing of a door from the cessation of "open door" messages transmitted by the door Sensor/Transmitters.

CAN Bus Approach

This system consists of one CAN Monitor/Transmitter mounted anywhere in the vehicle where the CAN Bus wiring is accessible. The CAN Monitor/Transmitter monitors the data on the CAN bus and detects messages that contain data indicating the position of the doors. Upon detecting the door condition messages the CAN Monitor/Transmitter will transmit "door open" or "door closed" messages to the vehicle mounted Receiver. The receiver will act on the messages and signal the step Controller to extend or retract the step(s). Since "door open" and "door closed" messages are transmitted to the Receiver the receiver only acts on the message data and performs no timed action on the cessation of received messages.

Common System Components

Both systems incorporate identical Step Controllers. The Receivers of both systems are identical in hardware design, the only differences lie in the message processing software of the receivers. Both Receivers utilize identical message protocols, patent document FIG. 8B describes the message content.

The Power Board is an automatic vehicle entrance and exit step that lowers for use when a vehicle door is opened and retracted when the door is closed. Traditional installation of the board requires modification of the vehicle to gain access to the door light switch wiring to sense door movement. Wiring is installed that accesses the vehicle wiring and is routed to a controller in the vehicle engine compartment. The controller engages the step motors to lower and retract the step.

Figure 1:
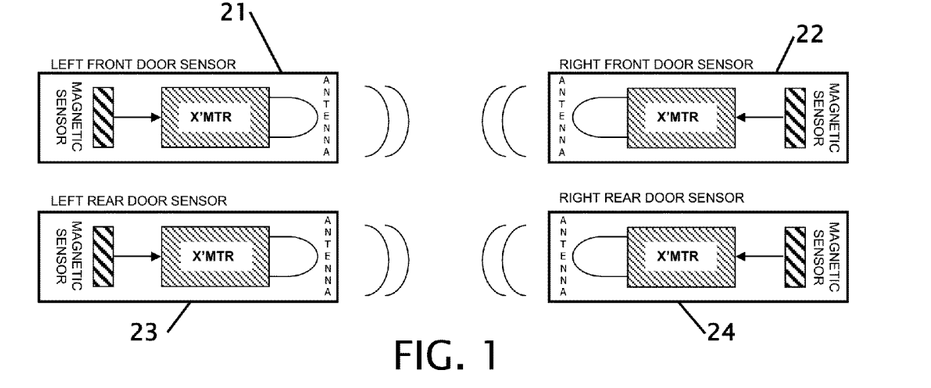
FIG. 1 shows four wireless door sensors.
Figure 2:
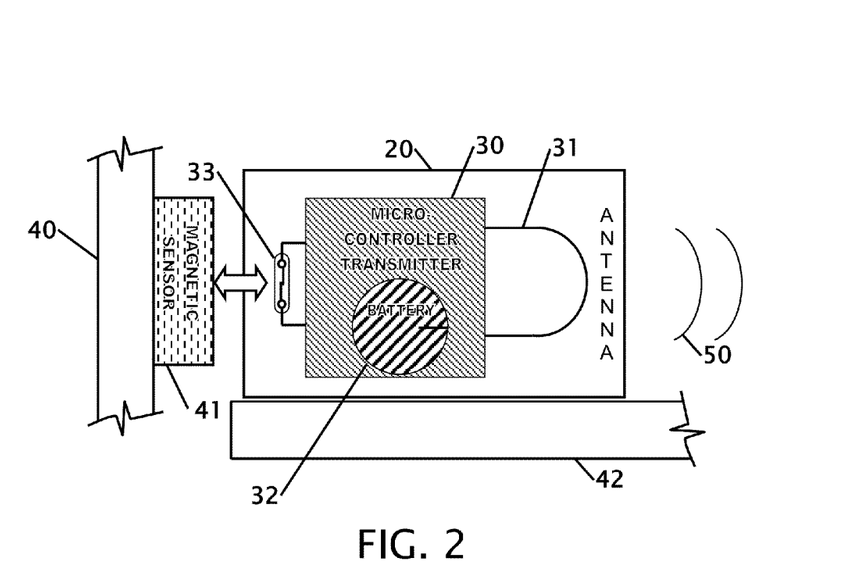
FIG. 2 shows a detailed view of the wireless door transmitter.

FIG. 1 shows four wireless door sensors. A wireless car door sensor system eliminates the need to modify the vehicle wiring and simplify the installation of the power board is comprised of door sensors 21-24 installed on each door. For vehicles with only two doors, only a single left and right door sensor will be used. FIG. 2 shows a more detailed view of the internal and external components used in the sensor/transmitter.

FIG. 2 shows a detailed view of the wireless door transmitter on vehicles that do not have a CAN bus. Each door sensor 20 consist of transmitter 30 coupled with reed switch 33, or a proximity switch, having contacts that are effected by the presence or absence of a magnetic field caused by a magnet 41 or a ferric material near the magnetic field. The magnet 41 or the magnetic sensor 20 is mounted on the edge of each door 42 opposing the doorjamb 40. A magnet 41 is mounted in the doorjamb 40 that comes in close proximity to the transmitter's magnetic sensor 33 when the door 42 is closed. The effective range of most reed switches 33 is one inch or less and is based upon the strength of the magnetic field that is created or coupled by the magnet 41. This figure and the description show and describe a preferred embodiment for orientation, location and placement. Other embodiments are also contemplated that will provide the equivalent result of signaling when a car door has been opened and closed. The method of securing the transmitter 20 and or the magnet 41 can be as simple as tucking the components under body panels to gluing, bonding or screwing the components to a vehicle.

Figure 3A:
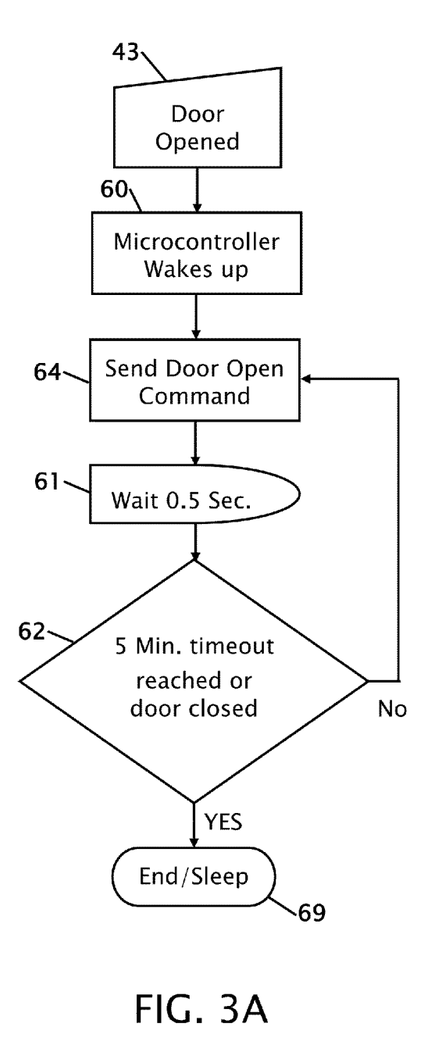
FIG. 3A shows a block diagram of the code flow chart in the transmitter.

A battery 32 is included with the transmitter 20 along with an antenna 31 that transmits 50 a signal based upon the status of the sensor 33. The transmitter 20 operates in a low power sleep mode until the magnetic sensor 33 senses a movement of the magnet 41. FIG. 3 shows a flow chart of the general operations within the microcontroller-transmitter 40.

FIG. 3A shows a block diagram of the code flow chart in the transmitter on vehicles that do not have a CAN bus or on vehicles that are not connected into the CAN bus. The transmitter operates in a low power sleep mode until a door is moved 43. Since the sensing distance of the preferred reed switch sensor is limited, the detection of movement of the door is generally limited to motion when a door is just being opened and when the door latches shut. The opening and closing of the door 43 changes the status of the sensor and wakes up 60 the microcontroller from sleep. After the microcontroller wakes up 60 it will detect the status of the door and determine if the door is opened or closed. If the door is opened 43 the microcontroller will initiate the transmission of door open messages 64.

Figure 8A:
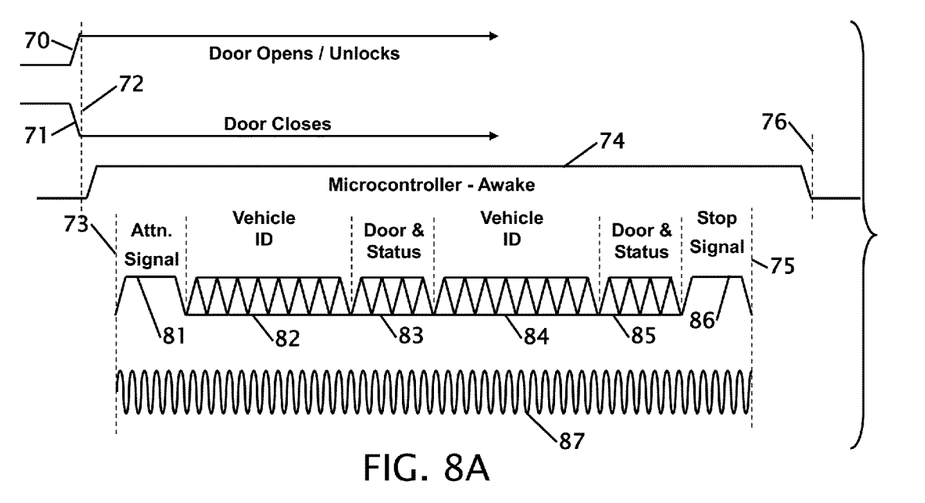
FIG. 8A shows the wireless data transmission from a transmitter.

If the door is now closed 62 the microcontroller will cease open door message transmissions. After the opened 64 command has been transmitted the microcontroller will repeat open door messages on a 0.5 second interval 61 until either the door is closed or a five minute time out period is reached after which the microcontroller will re-enter the sleep mode. While in the preferred embodiment a 5 five minute time out period is used it is contemplated that the time out period can be between one minute and 15 minutes. Various methods and frequencies of data transmission are contemplated including but not limited to frequencies that are utilized by car locking devices and garage door remote controls. While a 0.5 interval is preferred as a dead man type device to ensure that the door is still open an interval as small as 0.1 seconds to as long as 5 seconds between transmissions is contemplated. These frequencies are typically 315~930 MHz but can be lower or higher in carrier wave frequency. One contemplated transmission protocol is shown and described with FIG. 8.

Figure 3B:
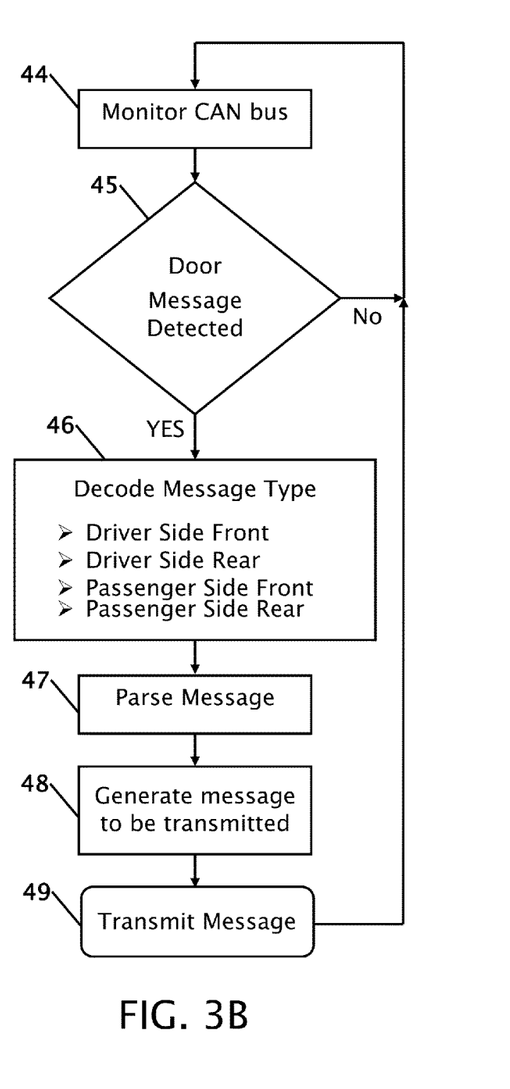
FIG. 3B shows a block diagram of the CAN bus flow chart.

FIG. 3B shows a block diagram of the CAN bus flow chart. When a vehicle has a CAN bus, a CAN node monitors 44 the bus to determine is a door related message is detected 45. The message is decoded 46 as a driver side front door, a driver side rear door, a passenger side front door and a passenger side rear door. The message is parced 47 and the transmitter generates a message 48. The message is the transmitted 49. The node can be connected to the motor(s) that control the step or can be in wireless communication to the motor(s) that operate the step. It is also contemplated that the CAN node can transmit a signal on said CAN bus to indicate the status of the step(s).

Figure 4:
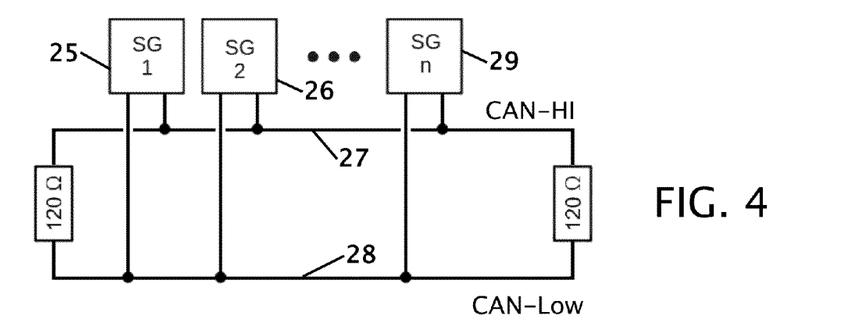
FIG. 4 shows a common connection for a CAN bus in a vehicle.
Figure 5:
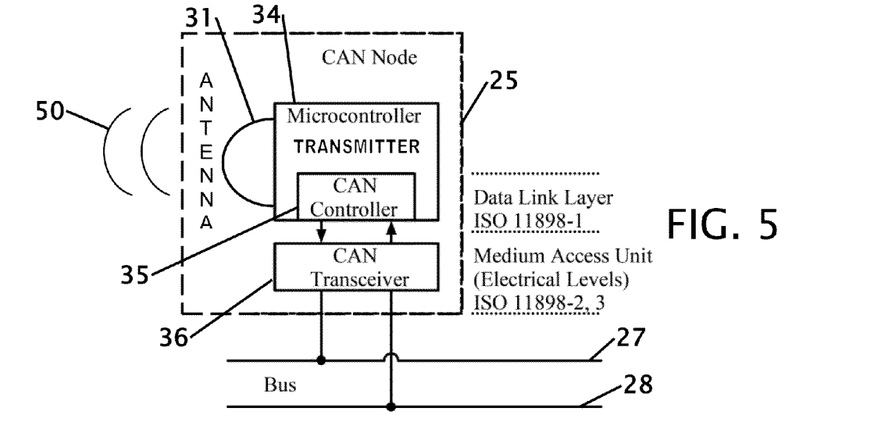
FIG. 5 shows a connection for a CAN Node.

FIG. 4 shows a common connection for a CAN bus in a vehicle, and FIG. 5 shows a connection for a CAN Node. In a vehicle multiple CAN nodes 25, 26, 29 and more exist in different locations in a vehicle. The CAN nodes can listed to the bus lines 27 and 28 as well as communicate over the CAN bus. In the preferred embodiment the CAN node that controls the step(s) just listen to the CAN bus, but can communicate to indicate the status of the step.

In FIG. 5 there is a CAN Transceiver 36 that operates with Medium Access Unit Electrical Levels per ISO 11898-2, 3. The CAN Controller 35 is a Data Link Layer that operates under ISO 11898-1. The microcontroller is shown with an integrated wireless transmitter, but the transmitter can be a separate unit or can be performed with a wired connection to the step(s). The wireless communication was previously described with FIGS. 1-3 and 8-10 herein.

Figure 6:
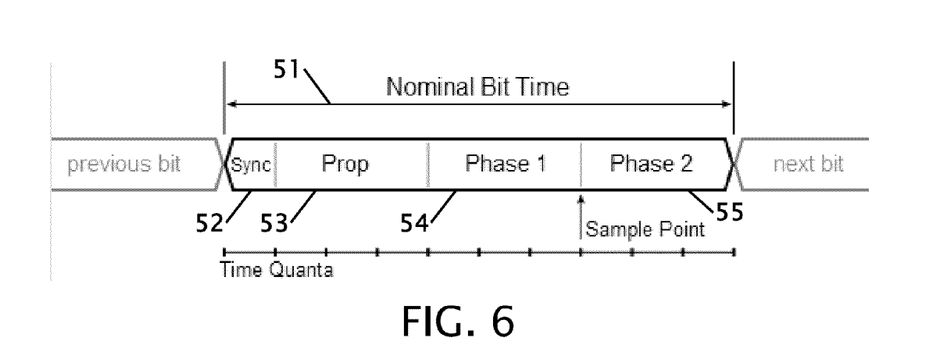
FIG. 6 shows a communications protocol over a CAN bus.
Figure 7:
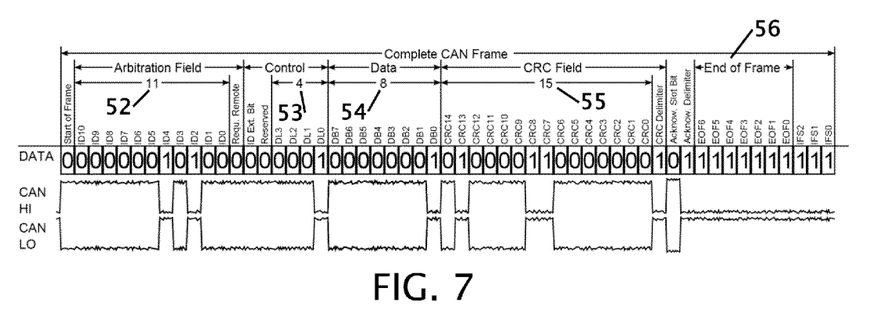
FIG. 7 shows detailed information regarding the CAN bus protocal.

FIG. 6 shows a communications protocol over a CAN bus, and FIG. 7 shows detailed information regarding the CAN bus protocal. The CAN bus protocal shown is a current standard, but can change in the future. Regardless of the protocol, detection of commands from a Controller Area Network (CAN) in a vehicle that identify a door open, door lock status, seatbelt status, manual switch or other desired change to the CAN bus can be used to operate a step or other ingress or egress feature. The CAN bus protocol operates in a Normal Bit Time 51. Each Normal Bit Time 51 has a start of the frame followed with Sync bits. The status of some of the bits are fixed based upon the vehicle or the vehicle configuration. Following the Sync 52 are Prop bits 53. Again, some bits can be fixed based upon the vehicle or the vehicle configuration. After the Prop bits 53 is phase 1 and includes Data bits and is then followed with Phase 2 for the CRC Field. An End of Frame follows the data bits.

Each vehicle can have different bits that are set or cleared based upon the features and functions of the vehicle. To determine the commands that will operate the step an oscilloscope or protocol analyzer can be connected to the CAN bus and the bits are monitored to determine what bits change based upon operation of different parts of the vehicle, like a door opening.

FIG. 8A shows the wireless data transmission from a transmitter. While this data transmission protocol shows a particular order for the transmission various other baud rates, start bit(s), stop bit(s), command orders and redundant commands are contemplated. In one preferred embodiment the opening 70 or closing 71 of a door will change the status of the sensor and trigger 72 the microcontroller to awaken 74. The microcontroller will determine the status of the door sensor switch and turn on the transmitter to begin 73 transmission of the signal. The sine wave 87 of the transmission frequency is shown for reference, but the preferred embodiment uses a transmission frequency is 915 MHz Other frequencies are contemplated but these frequencies are generally preferred for transmissions of short bursts of data and have a range of several hundred feet or less.

The transmission of the data begins with an attention or start bit(s) signal 81. The data then includes a vehicle ID 82. It is contemplated that the vehicle ID will include options of 100 to 256 vehicles to reduce the possibility that opening the door of a first vehicle will inadvertently extend the step of both the desired first vehicle and an undesirable second vehicle. The data also includes a status indicator of the door and the status of the door 83. To reduce the possibility of a step extending or retracting with a stray signal from a car door being unlocked or a garage door being opened a redundant vehicle ID 84 and door status 85 is transmitted. The order of these commands as well as the second set of commands being inverted are contemplated to reduce the possibility of a step extending or retracting at an undesirable time. It is also contemplated that the transmitted signal includes a check sum. After the transmission of command data has been sent the transmitter will send a stop command 86 or will remain silent for some period of time while the transmitter is turned off 75 and the microcontroller ensures the status of the door is unchanged (67 from FIG. 3). The microcontroller will then return to a low power sleep mode 76.

Figure 8B:
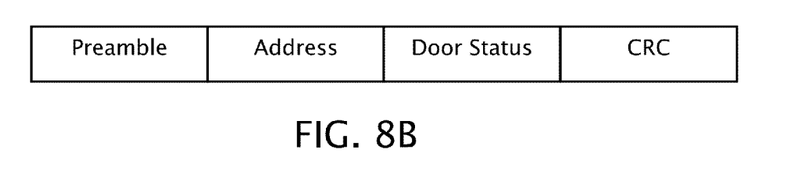
FIG. 8B shows the wireless data transmission from a transmitter when using the CAN bus.

FIG. 8B shows the wireless data transmission from a transmitter when using the CAN bus. When the CAN bus is being used the transmitter and the receiver both receive power from the battery system of the vehicle. Redundancy of transmission is not required because a cyclic redundancy check (CRC) is used. The block of the transmission include a preamble, an address, door status bits and the cyclic redundancy check (CRC).

Figure 9:
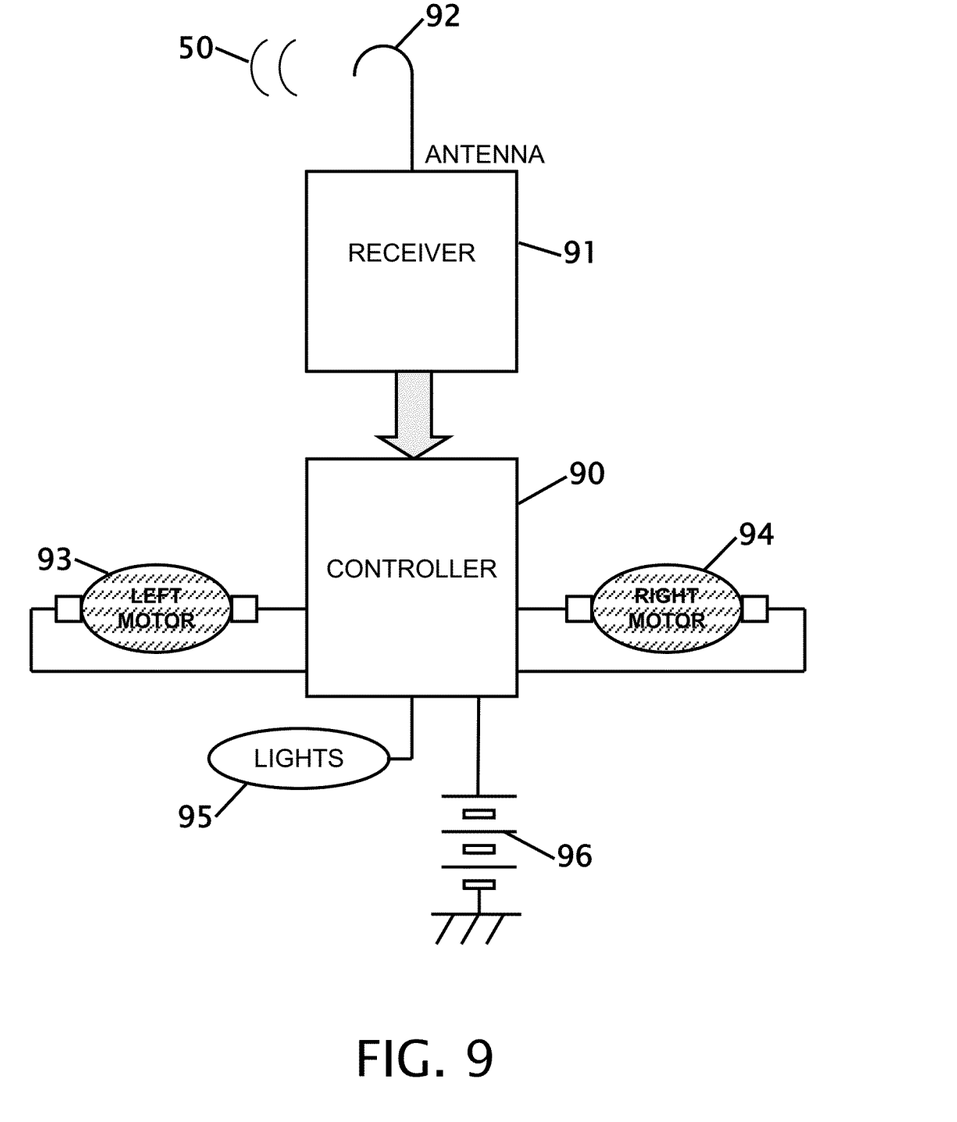
FIG. 9 shows block diagram of the receiver unit and the step controller motors.

FIG. 9 shows block diagram of the receiver unit and the step controller motors. The receiver 91 receives the wireless command 50 from an antenna 92 and communicates the decoded command to a controller 90. In one contemplated embodiment the receiver 91 includes one or a plurality of contacts that simulate the car door sensors opening and closing using solid state or mechanical relays. In this contemplated embodiment an existing controller 90 receives and acts upon equivalent contact closures that would be detected from the closures being hard wired to the door switches or a vehicle. The receiver 91/controller 90 is typically installed in the vehicle engine compartment or underneath the vehicle where it is wired to the electrical system and battery 96 to power lights 95, the left 93 and or right 94 motors.

Figure 10:
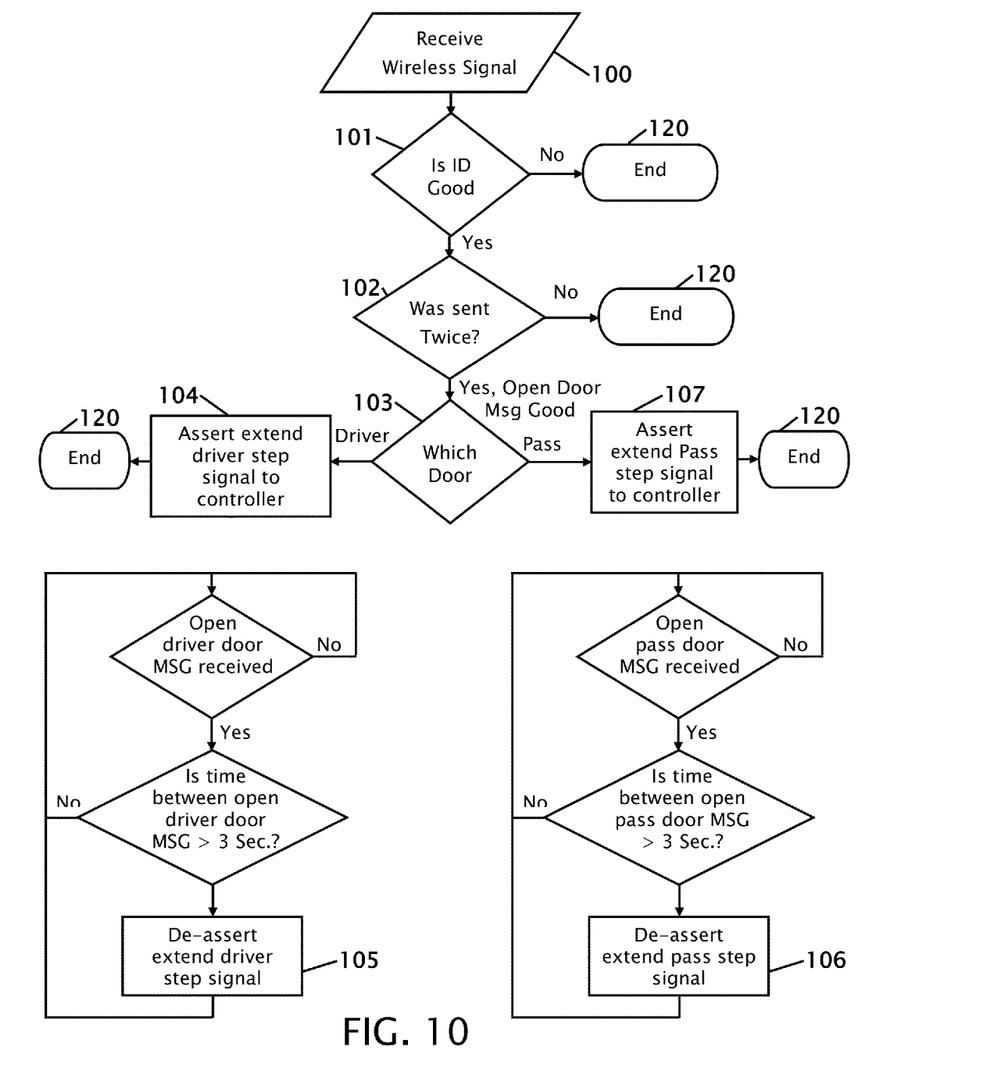
FIG. 10 shows a block diagram of the code flow chart in the receiver.

FIG. 10 shows a block diagram of the code flow chart in the receiver. The receiver/controller listens to receive the messages 100 and determines if the received signal and the ID is good and or valid 101. If the data is found to be invalid the microcontroller will not take any action and end 120 or return to a listen state. If the data is valid the microcontroller will further check to ensure that the command was sent twice 102. Again if this check shows that the data is not valid the process will end 120. Since that command is now considered valid the receiver will determine which door changed state 103 and will branch to either the driver 104 or passenger 107 door to determine the status of the door to command the controller to retract or extend 105, 106 the appropriate step. The four door transmitters, stores the message data, and determines the correct responses and end 120 or wait for an additional command. If a door on either side of the vehicle is open the receiver asserts the proper signal to the controller to engage the appropriate step motor and lower the step. A step will remain lowered until the receiver/controller receives messages indicating that both doors on a vehicle side are closed.

Figure 11:
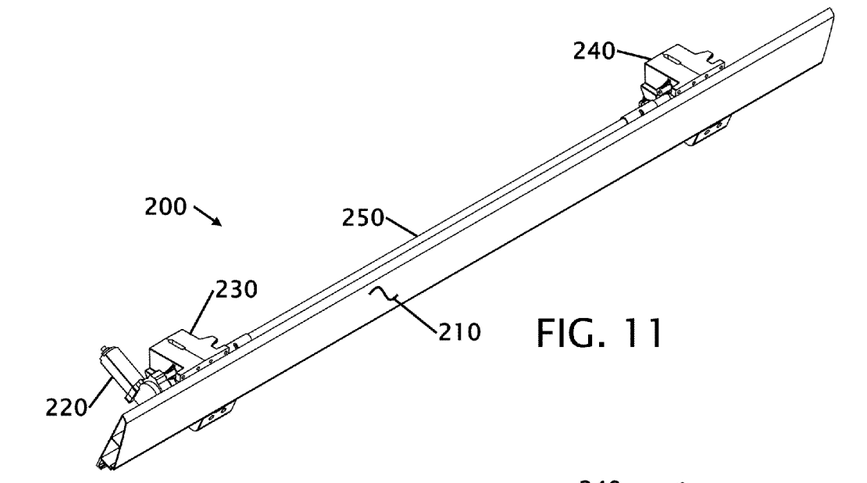
FIG. 11 is a front perspective view of a retracted step.
Figure 12:
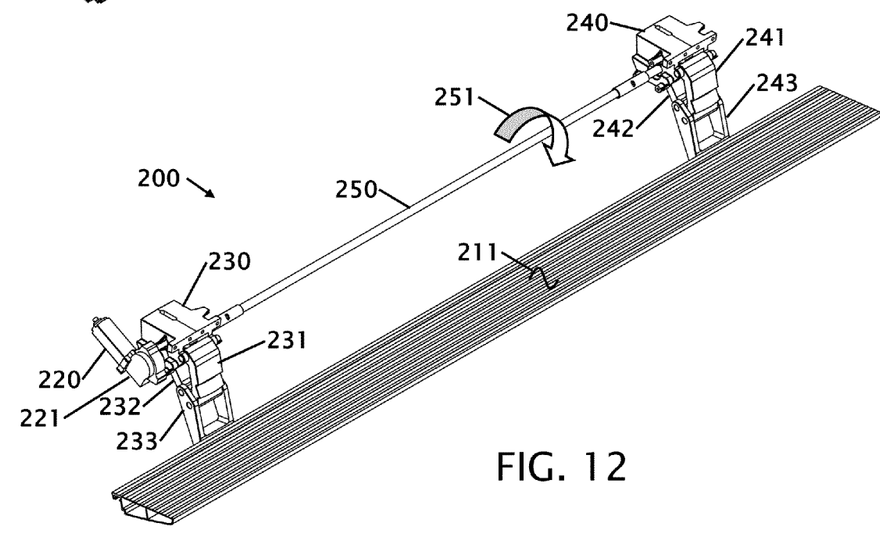
FIG. 12 is a front perspective view of an extended step.

FIG. 11 is a front perspective view of a retracted step 200 and FIG. 12 is a front perspective view of an extended step 200. The step extends from an elevated position, as shown in FIG. 11, to a deployed position, as shown in FIG. 12. In the retracted position the bottom 210 of the step covers the majority of the mechanism to provide some protection from debris, water or other contamination from harming the mechanism. The motor 220 is arranged in a position to reduce fluid and moisture from entering into the motor or the gear transmission 221. The motor 220 and the gear transmission 221 is sealed to prevent intrusion of moisture and water. The sealing prevents water from entering into the mechanism when the vehicle is exposed to rain, drives through a pool or water or the vehicle is fording a stream or other water way. The motor 220 is energized when the controller 90 receives a signal from one or more of the wireless transmitters 21-24 (previously shown and described).

As the motor 220 turns a gear reduction transmission 221 reduces the rotational speed and alters the rotational direction. The altered rotational directions enters into housing 230. A portion of the rotational energy is transmitted along torsion shaft 250 to a second housing 240.

The torsion bar 251 that is attached between the drive shaft of the motor 220 directly to the pivot point of the idler shaft that serves several functions. By driving the idler with the torsion bar 251, both linkages 232 and 242 pull up together. This keeps the board 211 from hanging down and presenting an uneven appearance on the idler side. Twist 251 of the torsion bar 251 pulls up both linkages 232 and 242 evenly thus removing any misalignment between the motor linkage 221 and the idler 240 linkage. This prevents corner loading of the bushings and keeps the any noise from occurring because of the uneven bushing contact. Because of a better load distribution on the motor 220, the torsion bar 251 will extend the life of the motor 220. While the drawings show a motor linkage 221 and a single idler 240, it is contemplated that more than one idler 240 could be incorporated to provide stability to a longer board 211.

Both housing 230 and 240 have internal gears that convert the rotation to rotate rear tension members 232, 242 and front tension members 231, 241. The rear tension members 232, 242 and the front tension members 231, 241 are connected to arms 233 and 243 respectively. These two sets of tension members are unequal length and as they rotate they move the step between the elevated position of FIG. 11 and the deployed position of FIG. 12. Front and top views in FIGS. 13-15 provide additional clarity of the deployment.

Figure 13:
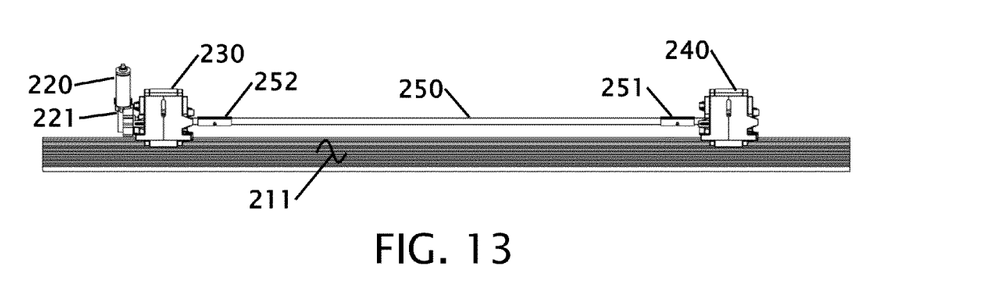
FIG. 13 is a top view of the retracted step.
Figure 14:
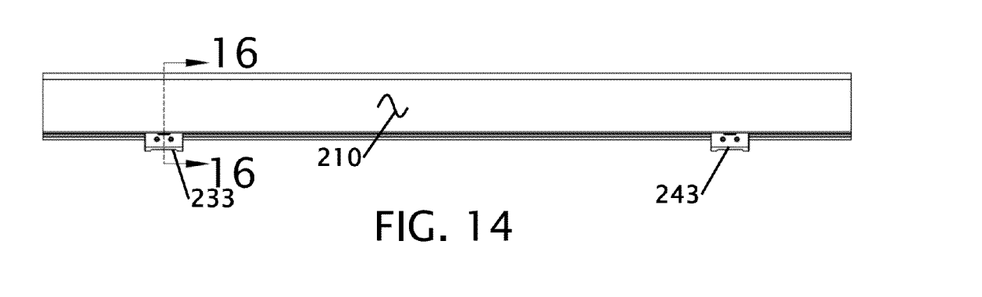
FIG. 14 is a front view of the retracted step.
Figure 15:
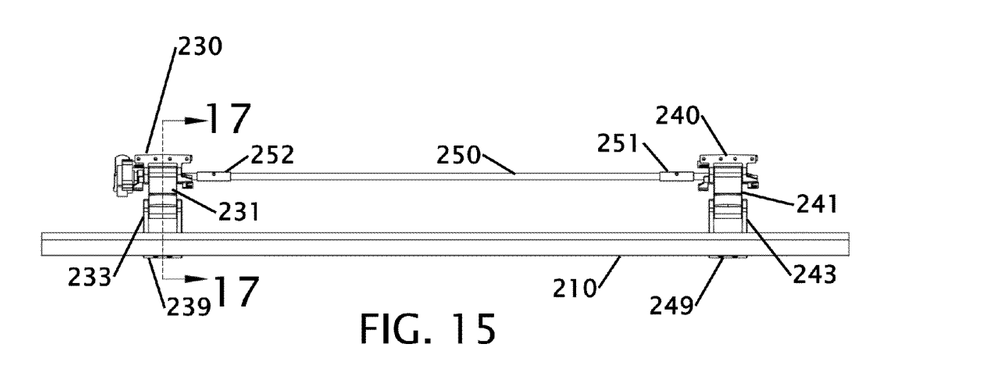
FIG. 15 is a front view of the extended step.

FIG. 13 is a top view of the retracted step 211, FIG. 14 is a front view of the retracted step 211 and FIG. 15 is a front view of the extended step 210. In the retracted position, the step is brought under the vehicle. In the extended position the step allows a person to step onto the elongated platform 211 to essentially split the height from the ground to the floorboard to the vehicle where the extendable step is mounted. The motor 220 is shown connected to the transmission 221. The transmission is mounted to the left housing 230. A coupling 252 is connected to a transmission shaft 250 to a coupling 251 and then to the right housing 240. The left housing 230 and the right housing 240 are bolted or otherwise secured to the underside or the frame of the vehicle. From the front view of FIG. 15 the front tension members 231 and 241 are visible and connected to arms 233 and 243 respectively. Arms 233 and 243 are connected to the step platform 210 at 239 and 249.

Figure 16:
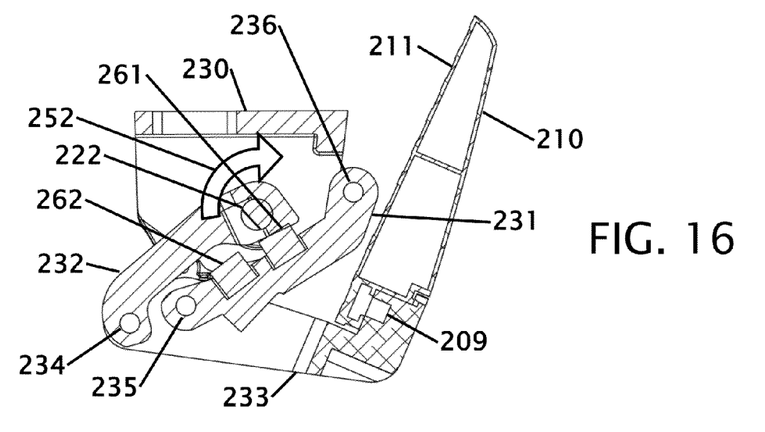
FIG. 16 is a sectional view of the retracted step cut from section 16-16 from FIG. 14.
Figure 17:
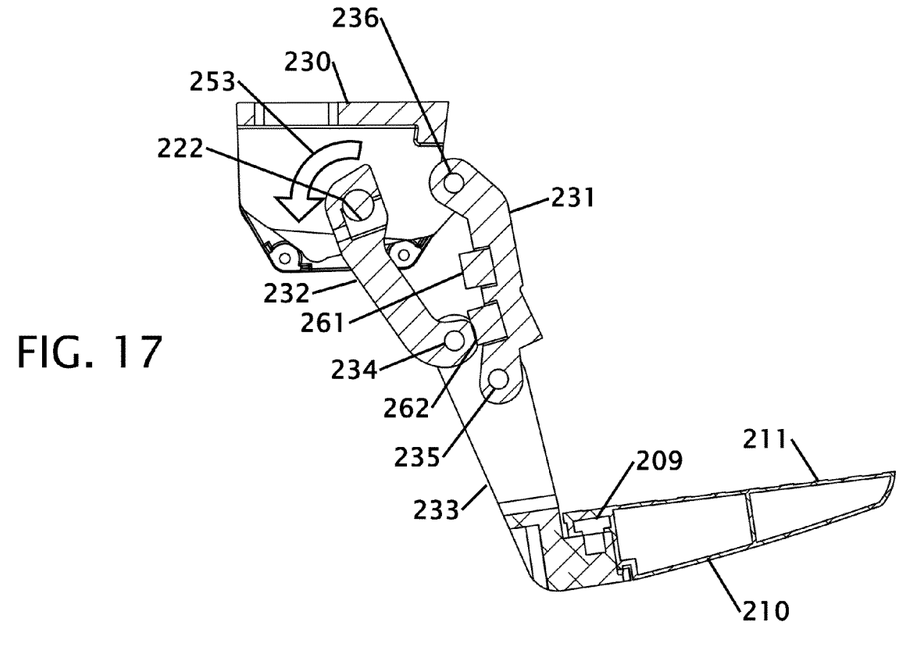
FIG. 17 is a sectional view of the extended step cut from section 17-17 from FIG. 15.

FIG. 16 is a sectional view of the retracted step cut from section 16-16 from FIG. 14 and FIG. 17 is a sectional view of the extended step cut from section 17-17 from FIG. 15. The gear transmission (not shown in this figure) connects to shaft 222 that is connected to the rear articulating arm 232.

Shaft 222 is connected to the torsion bar 250 (not shown in this figure). In FIG. 17, counter-clockwise rotation 253 of the shaft extends the board 211. This rotation of the shaft is transmitted down the torsion bar to the idler linkage. Driving the idler with the torsion bar, both linkages pull up together. In FIG. 16, clockwise rotation 252 of the shaft 222 is transmitted through the torsion bar 250 and raises the board 211 on both sides evenly.

As the rear articulating arm 232 rotates, the rotation applies forces to the arm 233 through the pivot pin 234. The arm 233 is connected to the foot pad and also through pivot 235. Pivot 235 is connected to the front arm 231 that is connected through pivot 236 on the housing 230. This two-link of rotating arms 231 and 232 allows the foot pad to retract and rotate from the retracted to the extended position to expose the foot tread surface 211 or the back of the footpad platform 210. The foot pad is connected with a fastener 209 to the arm 233. In the retracted position a cushion 261 prevents vibration of the mechanism and the foot pad. In the extended position, a cushion 262 prevents vibration and provides some cushion as a person steps onto the platform 211.

Figure 18:
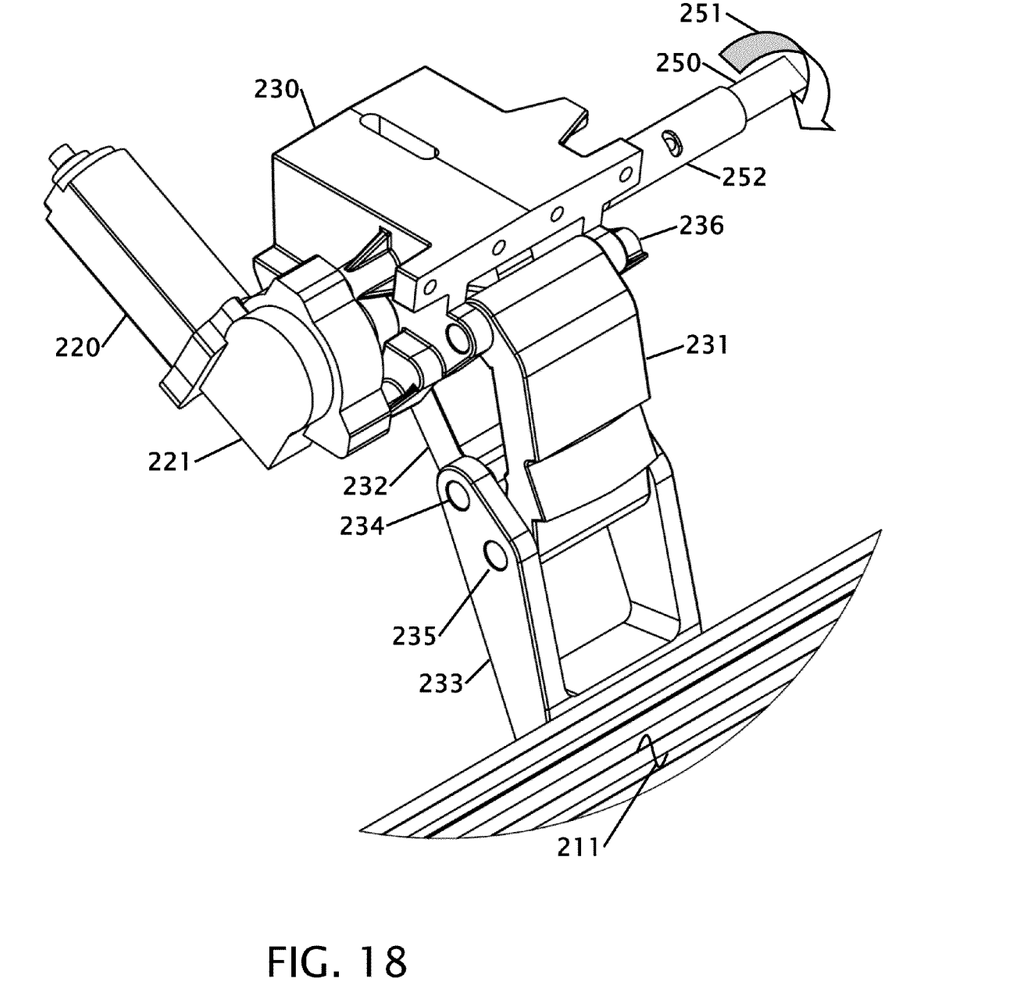
FIG. 18 is a perspective detail view of a portion of the motor mechanism from FIG. 12.

FIG. 18 is a perspective detail view of a portion of the motor mechanism from FIG. 12. In this figure the motor 220 is shown connected to the transmission 221. The transmission 221 is connected to the housing 230. From the other side of the housing 230 a coupling connector 252 is shown connected to the torsion arm shaft 250. The rear articulating arm 232 and the front articulating arm 231 are connected to arm 233 with pins 234 and 235. One end of the front arm 231 is connected with pivot pin 236. The arm 233 is shown passing under the foot pad rail 211.

Thus, specific embodiments of a retractable truck step with CAN bus interface have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A controller area network (CAN) bus interface that controls an entry and exit step comprising:
   a CAN node on a vehicle;
   said CAN node monitors a CAN bus to detect when action from a person requires an entrance and exit step to be extended or retracted;
   said action from said person changes a door opening or closing;
   upon said action said CAN node commands said exit step to extend or retract;
   said command is a wired command or a wireless command, and
   said CAN node is added to a pre-existing vehicle CAN bus vehicle.

2. The CAN bus interface that controls an entry and exit step according to claim 1, wherein said emitted wireless signal includes multiple transmission addresses.

3. The CAN bus interface that controls an entry and exit step according to claim 1, wherein said wireless signal includes a cyclic redundancy check.

4. The CAN bus interface that controls an entry and exit step according to claim 1, wherein CAN node decodes an opening and closing of a driver side front door, a driver side rear door, a passenger side front door and a passenger side rear door.

5. The CAN bus interface that controls an entry and exit step according to claim 4, wherein said command instructs one or more of said entrance and exit steps to be extended or retracted.

6. The CAN bus interface that controls an entry and exit step according to claim 1, wherein said CAN node parses data from said CAN bus to determine a status change of all the doors on said vehicle.

7. A retractable truck step with wireless door sensor comprising:
   at least one motor connected to at least one transmission that extends and retracts at least one automated vehicle entrance and exit step;
   said at least one automated vehicle entrance and exit step is placed at a driver side of said vehicle and at a passenger side of said vehicle;
   said least one motor that is connected to at least one transmission is sealed from water intrusion;
   at least one sensor that detects when a door is opened and or closed;
   said sensor emitting a wireless signal to a receiver when said door is opened and closed;
   said wireless signal includes vehicle ID information, and
   a receiver that receives said emitted wireless signal to operate said motor.

8. The retractable truck step with wireless door sensor according to claim 7, wherein said emitted wireless signal includes multiple transmission addresses.

9. The retractable truck step with wireless door sensor according to claim 7, wherein said wireless signal is sent at a timed interval of 0.1 to 5 seconds to identify that the door is still open.

10. The retractable truck step with wireless door sensor according to claim 9, wherein said receiver detects an absence of signals from said sensor.

11. The retractable truck step with wireless door sensor according to claim 7, wherein said controller operates said at least one motor that extends and retracts said at least one automated vehicle entrance and exit step.

12. A retractable truck step with wireless door sensor according to claim 7, wherein said transmission is with a torsion bar link between said at least one motor and at least one idler linkage.

13. A retractable truck step with controller area network (CAN) bus interface comprising:
   a CAN node on a vehicle;
   said CAN node monitors a CAN bus to detect when action from a person requires an entrance and exit step to be extended or retracted;
   said action from said person is a change in a door opening or closing;
   at least one motor connected to at least one transmission that extends and retracts at least one automated vehicle entrance and exit step;
   said at least one automated vehicle entrance and exit step is placed at a driver side of said vehicle and at a passenger side of said vehicle, and
   upon said action said CAN node commands said at least one motor to extend or retract said at least one automated vehicle entrance and exit step, and
   said at least one transmission is with a torsion bar link between said at least one motor and at least one idler linkage.

14. The retractable truck step with CAN bus interface according to claim 13, wherein said CAN node is wired to said at least one motor.

15. The retractable truck step with CAN bus interface according to claim 13, wherein said CAN node uses a wireless communication to said at least one motor.

16. The retractable truck step with CAN bus interface according to claim 13, wherein said wireless communication includes multiple transmission addresses.

17. The retractable truck step with CAN bus interface according to claim 13, wherein said wireless communication is to a controller that operates said at least one motor that extends and retracts said at least one automated vehicle entrance and exit step.

* * * * *